United States Patent [19]

Nussbaum

[11] 4,064,868

[45] Dec. 27, 1977

[54] SOLAR HEAT COLLECTOR

[75] Inventor: Otto J. Nussbaum, Huntsville, Ala.

[73] Assignee: Halstead Industries, Inc., Scottsboro, Ala.

[21] Appl. No.: 731,030

[22] Filed: Oct. 8, 1976

[51] Int. Cl.[2] ............................................... F24J 3/02
[52] U.S. Cl. ....................................... 126/271; 165/182
[58] Field of Search ............... 126/270, 271; 237/1 A; 165/182

[56] References Cited

U.S. PATENT DOCUMENTS

| | | | |
|---|---|---|---|
| 2,907,318 | 10/1959 | Awot | 126/271 |
| 3,923,038 | 12/1975 | Cutehaw | 126/271 |
| 3,945,059 | 3/1976 | Allocco, Jr. | 126/271 |
| 3,980,071 | 9/1976 | Barber, Jr. | 126/271 |
| 3,983,861 | 10/1976 | Beauchaine | 126/271 |

*Primary Examiner*—Kenneth W. Sprague
*Attorney, Agent, or Firm*—Thomas H. Murray

[57] ABSTRACT

A heat collector for absorbing solar energy includes a hollow panel with an insulated backwall connected to a cover plate by insulated spacer side walls. A conduit extends to and fro between opposed side walls in the space between the cover plate and the backwall. Spaced-apart heat transfer fins are in intimate heat conductive contact with the conduit. The fins extend in a generally radial direction from the conduit and include bent fin portions that project in a coplanar manner along the space between the conduit and the backwall within a plane which is generally normal to incident beam radiation. In one embodiment, the unbent portion of the fins projects within an included acute angle from the face surface of the conduit; while in the second embodiment, the included angle is a right angle. Heating means, controlled by a thermostat responsive to the ambient temperature, is provided within the collector panel to maintain a predetermined temperature within the panel and thereby prevents freezing of the fluid media within the conduit.

12 Claims, 6 Drawing Figures

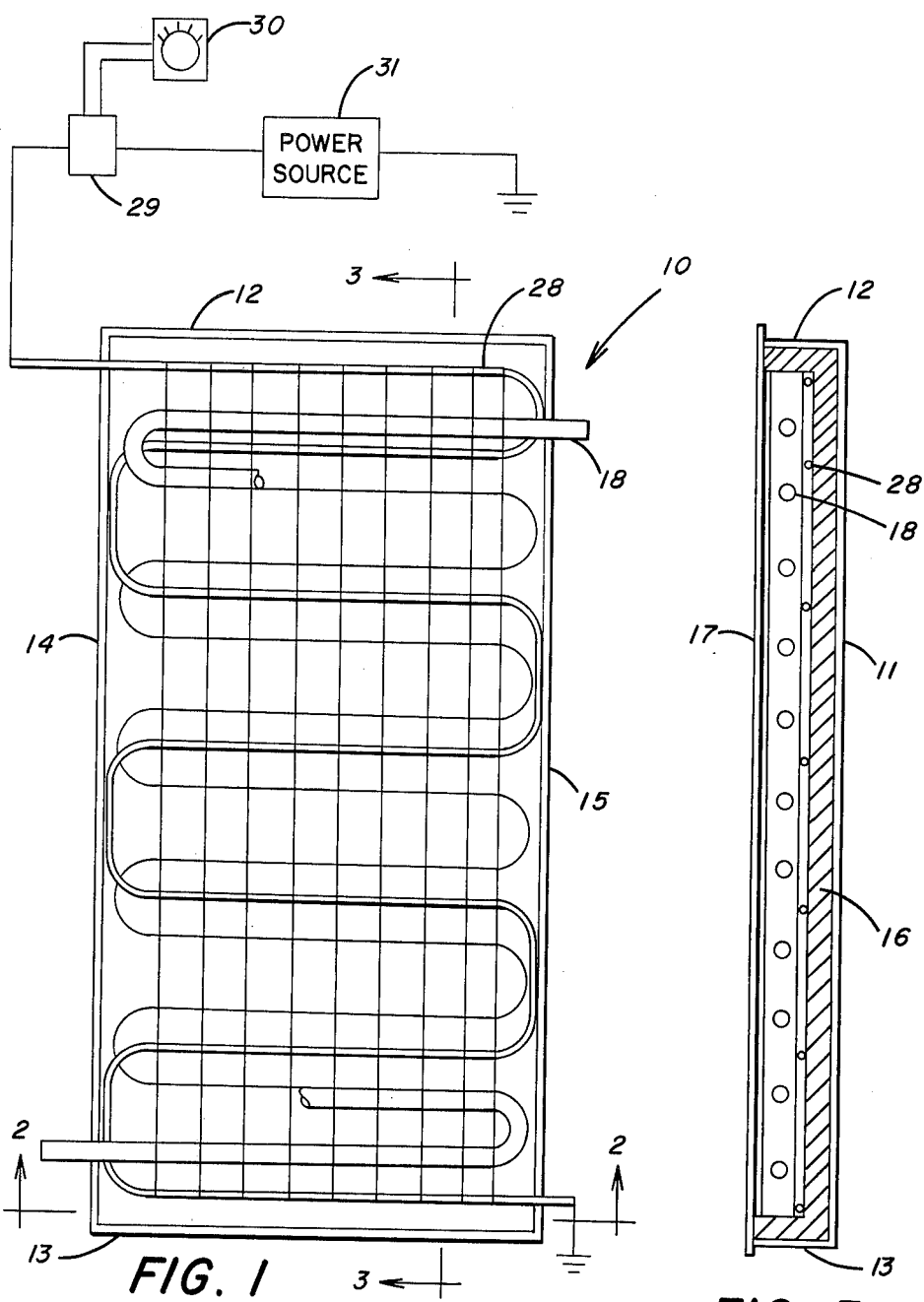
FIG. 1
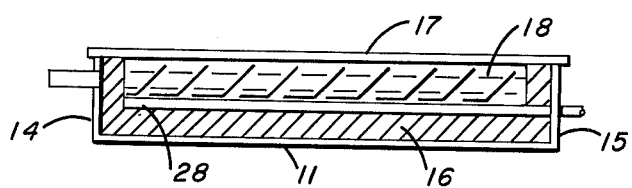
FIG. 2
FIG. 3

SOLAR HEAT COLLECTOR

BACKGROUND OF THE INVENTION

This invention relates to a solar heat collector wherein the heat absorbing surface primarily consists of a multiplicity of fins in intimate, heat transfer contact with a conduit used to supply a fluid medium to undergo heating by solar radiation. More particularly, the present invention relates to such a solar heat collector wherein the fins include bent portions to receive beam radiation from the sun, to increase the flux of heat to the fluid circulating in the conduit and electrical heating means within the collector to maintain the temperature therein above the freezing point of the fluid.

The principle of solar energy collectors is well known in the art which includes a description and analysis in the publication "Solar Energy Thermal Processes" by Duffie and Beckman, published by John Wiley & Sons in 1974. Solar collectors basically consist of an enclosure containing a metal plate in contact with fluid passageways. These passageways are integral with the plate or provided by tubes joined in some manner so as to be in a heat-conductive relation with the plate. One or more transparent covers permits solar radiation to reach the plate and prevent conductive heat transfer away from the enclosure. One particular known cover plate consists of two glass plates separated by a space that has been evacuated and maintained airtight. The enclosure is arranged so that the glass plate cover faces the sun while the opposite side is insulated to prevent convection losses. The remaining sides of the enclosure are insulated and sealed to prevent atmospheric contamination and the infiltration of moisture.

The use of a collector surface in the form of a single flat plate has certain distinct disadvantages. The effective heat absorbed by the plate and conduction of heat to the fluid within the tubes are dependent upon efficient flux of heat, the thickness of the plate and the distance between two adjoining tubes carrying the fluid. In view of these parameters, it was possible to build an efficient flat plate collector so long as the plate was made of a highly conductive material, such as copper, of substantial thickness and with closely-spaced tubes joined to the copper plate. However, because of the design and material requirements, it is not possible to produce a collector of this type economically.

SUMMARY OF THE INVENTION

It is an object of the present invention to provide a solar heat collector having an improved design and relationship of parts to enable economically feasible manufacturing and insure a desired flux of heat into a conduit for efficient heating of a fluid medium in the conduit.

It is a further object of the present invention to provide a plurality of relatively thin surfaces in the form of fins defining solar radiation receiving surfaces to increase the fundamental purpose of a solar heat collector.

It is another object of the present invention to provide a solar heat collector wherein a plurality of spaced-apart and relatively thin fins contacts a fluid-conducting conduit for the in-flux of heat thereto which is substantially increased by providing a bent back edge of each fin.

Still another object of the present invention is to provide finned surfaces extending from a conduit for a solar heat collector wherein the finned surfaces are bent in a generally normal direction to the incident beam radiation to materially increase the absorption of incident solar radiation including diffuse radiation.

It is still another object of the present invention to provide a solar heat collector in the form of a panel with a hollow interior surface wherein a tube carrying fins with bent edge portions extends between opposite side walls in a spaced relation between an insulated backwall and a cover plate while at the same time controlled electrical heating means are provided within the panel to prevent freezing of the heat transfer fluid medium within the tube.

In accordance with the present invention there is provided a heat collector for absorbing solar radiation wherein the heat collector comprises a collector panel defined by a thermal insulated backwall with projecting insulated side walls carrying an outwardly-spaced, visible light-transparent cover plate adapted to pass incident solar radiation toward the backwall, a conduit extending along in a spaced-apart relation between the backwall and the cover plate to conduct a fluid medium for heating within the panel and a plurality of spaced-apart heat transfer fins in intimate heat conductive contact with the conduit to absorb solar radiation and thereby increase the flux of heat into the conduit for heating the fluid medium therein, the heat transfer fins projecting from the conduit in a generally radial direction with respect to the flow direction of the fluid medium in the conduit, the heat transfer fins essentially including bent fin portions that project along within the space between the conduit and the insulated backwall.

In such a heat collector, the heat transfer fins are preferably arranged to project toward the cover plate and backwall with an included right angle or acute angle from the face surface of the conduit so as to increase to the greatest possible extent, the exposure of the surfaces of the fins to incident solar radiation. According to a preferred aspect of the present invention, heating means in the form of an electrical resistance heater extends within the space enclosed by the panel to maintain a predetermined minimum temperature therein so as to avoid freezing of the heat transfer fluid conducted within the aforementioned conduit.

These features and advantages of the present invention as well as others will be more fully understood when the following description is read in light of the accompanying drawings, in which:

FIG. 1 is a plan view of a solar heat collector embodying the features of the present invention;

FIG. 2 is a sectional view taken along line II—II of FIG. 1;

FIG. 3 is a sectional view taken along line III—III of FIG. 1;

Figure 5:
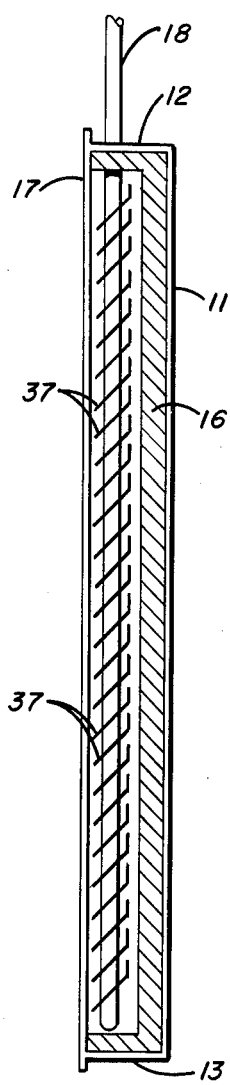
FIG. 5 is a sectional view similar to FIG. 3 but illustrating another modified form of the present invention.

According to the preferred embodiment of the present invention as illustrated in FIGS. 1–3, a solar heat collector 10 includes a rectangularly-shaped collector panel which essentially consists of a backwall 11 connected with walls extending about the peripheral edge of the backwall to form a continuous edge wall defined by opposed end walls 12 and 13 and opposed side walls 14 and 15. The interior face surfaces of the end walls, side walls and backwall are adhered to a layer of thermal insulation 16. This insulation can be constructed from individual panels adhered to the face surface of the walls or, alternatively, the insulation can be formed in situ by a casting-type process or spraying. Suitable insulation materials include asbestos, aluminum silicate, calcium silicate, fiberglass and other well-known lightweight thermal insulating materials. The insulation material upon the inside face surfaces of the side walls and backwall is employed to prevent the conductive transfer of heat away from the panel. A cover plate 17 is preferably transparent but essentially transmissive to the spectrum of solar light radiation to permit solar radiation to reach the hollow interior surface of the panel. The cover plate is an insulator against conductive and convective heat transfer because of the sealed air space. The cover plate is a component consisting of a single or a plurality of plates typically made from glass or transparent plastic with sealed air spaces between the individual plates and secured as a cover plate by mechanical fasteners or adhesive to the side walls. Gaskets or thermal breaks may be employed to prevent conduction of heat from the interior of the collector to the outside walls. The cover plate 17 is conductive to visible solar radiation having a wavelength spectrum of at least 0.38 to 0.78 micrometer but almost opaque to heat radiation, i.e., infrared with a wavelength greater than 0.78 micrometre. The space between the cover plate and the remaining closure walls of the panel may be evacuated but this space may be open to the atmosphere depending upon the specific application and design of collector enclosure.

A conduit 18 in the form of, for example, an aluminum or copper tube is passed through side wall 15 toward the opposite side wall 14 where a reverse (U-shaped) bend in the conduit is formed in a manner as shown in FIG. 1 so that the conduit extends back and forth between the opposed side walls 14 and 15 along the length of the panel. Thus, the conduit 18 consists of runs that extend parallel with the walls 12 and 13.

According to the present invention, a plurality of relatively thin fins 21 extends along in a spaced-apart relation and between walls 12 and 13 while located within the space between the insulation 16 and the cover plate 17. The fins 21 have annular openings 22 into which the conduit line 18 passes in an intimate heat conductive relation for the in-flux of heat due to the impingement of solar radiation upon the finned surfaces into the conduit line and thence into the fluid medium therein. The preferred form of the fluid medium is water, although other media may be employed. As best shown in FIG. 2, the fins 21 are arranged in a generally radial direction with respect to the flow direction of the fluid medium within the conduit line. More specifically, the fins 21 project toward the cover plate and toward the backwall from the face surface of the conduit with an included acute angle. The back edge 22 of the fins is bent over such that each bent fin portion projects in the same direction into a closely-spaced relation with the unbent surface of an adjacent fin. The bent portions of the fins are arranged to lie in a common plane that is generally normal to incident solar beam radiation but an air gap always exists between adjacent fins. Incident and scattered solar radiation is absorbed by a substantially increased finned surface consisting of the bent and unbent portions thereof. A film of heat absorbing material, e.g., black paint, may be adhered to the face surfaces of the fins to increase the absorption properties for solar radiation. Selective coatings may be adhered to the fins to provide improved absorptivity while reducing reradiation of heat away from the fins. It will be understood, of course, that the bent portions of the fins will absorb a substantial amount of direct beam solar radiation whereas the unbent portions of the fins will absorb a substantial amount of diffuse solar radiation.

When water is used as the heat carrying fluid medium in the solar heat collector, the danger of the water freezing becomes a serious problem when the ambient air temperature at the collector falls below 0° C. Such a problem is not adequately solved by a complicated draining system or the addition of anti-freeze to the water. Anti-freeze not only increases the cost but has the detrimental effect of reducing heat transfer both in the solar heat collector and at the terminal heat exchanger. The use of anti-freeze also mandates the use of an intermediate heat exchanger in the case of a potable water supply to separate the two liquids. The intermediate heat exchanger not only adds to the cost of the system but also requires a secondary circulating pump and reduces the heat transfer efficiency of the system.

To avoid these disadvantages arising out of the use of anti-freeze, the present invention provides a low-watt density resistance heating means in the form of an electrical resistance heater 28 that extends to and fro between the side walls 14 and 15 within the space between the bent portions 22 of the fins 21 and the layer of insulation 16 adhered to the backwall 11 of the panel. One end of the resistance heater 28 is grounded while the other end is connected to a relay 29 that is actuated in response to a thermostat 30. The thermostat is located externally to the panel and preferably is set to energize the relay 29 in response to the ambient temperature so as to maintain the temperature within the panel above 0° C. A suitable power source 31 is coupled to the resistance heater by the relay 29. Since the heat loss through the heavily-insulated enclosure formed by the panel is minimized by the design and the construction thereof, the amount of electric energy required to maintain above-freezing temperatures within the enclosure by the resistance heating means will be relatively insignificant. Resistance heaters of the type suitable for this purpose are inexpensive and commercially available. The heaters may be of the type presently available to protect outdoor plumbing from freezing.

In the solar heat collector shown in FIGS. 1—3, the heat loss through the enclosure formed by the panel can be approximated at 100 watts in extreme conditions when the ambient air temperature falls to −20° C. This resolves to approximately 60 watts per m² of collector surface. Assuming 1000 hours of heater operation during a winter season, the additional electrical energy consumption required for a 4 m² collector surface area would be in the neighborhood of 300-kilowatt hours per heating season. This consumption of electrical power will be considerably reduced at moderate and warm climates.

Figure 4:
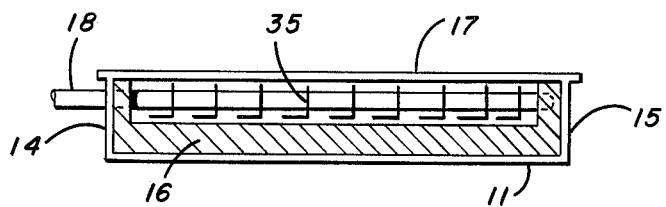
FIG. 4 is a sectional view similar to FIG. 2 but illustrating a modified form of the present invention.

In the modified form of the present invention illustrated in FIG. 4, fins 35 are arranged in substantially the same manner as the fins 21 previously described. However, in this instance, the fins project with an included right angle from the face surface of the conduit 18 so as to extend in a substantially parallel relation with the side walls 14 and 15. Aside from this arrangement of the fins, the same parts previously described in regard to FIGS.

1-3 are incorporated into the embodiment represented in FIG. 4.

Figure 6:
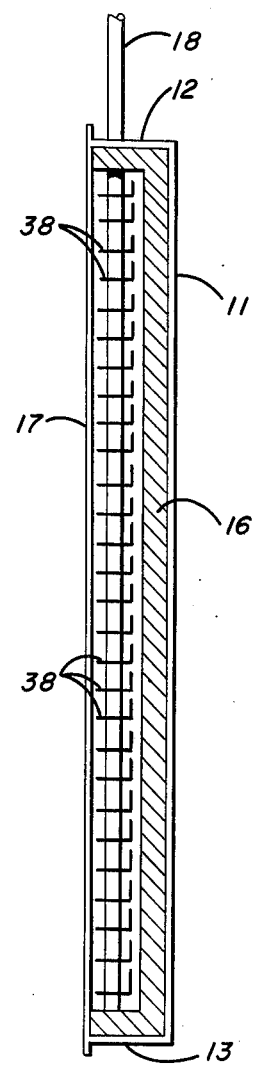
FIG. 6 is a view similar to FIGS. 3 and 5 but illustrating a still further modified form of the present invention.

In FIG. 5, there is illustrated a still further modification of the present invention wherein collector fins 37 extend between opposed side walls of the collector panel instead of the previously-described arrangement wherein the fins extend between the opposed end walls. The heat collector fins 37 project from the conduit 18 toward the cover plate 17 and toward the backwall 11 with an included acute angle. In the embodiment illustrated in FIG. 6, the fins 38 are arranged in the same manner as the fins 37 in regard to FIG. 5. However, the fins 38 project toward the faceplate 17 and toward the backwall 11 with an included right angle from the face surface of the conduit 18. It will be understood, of course, in regard to the embodiments of the present invention represented in FIGS. 5 and 6 that the conduit 18 is arranged to enter through one end wall and passed toward the oppositely-arranged end wall and thence by reverse bends to and fro between the end walls; whereas in regard to the embodiments of FIGS. 1-4, the conduit 18 was passed to and fro between the side walls 14 and 15. The electrical resistance heater has not been shown in regard to FIGS. 4-6 in the interest of clarity; however such heater means is provided according to the preferred aspect of the embodiments of the present invention.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A heat collector for absorbing solar radiation, said collector comprising:
    a collector panel defined by a thermal insulated backwall with projecting insulated side walls carrying an outwardly-spaced cover plate adapted to conduct incident solar energy toward said backwall,
    a conduit extending along in a spaced-apart relation between said backwall and said cover plate to conduct a fluid medium for heating within said panel, and
    a plurality of spaced-apart heat transfer fins in intimate contact with said conduit to absorb solar radiation and thereby increase the flux of heat into said conduit for heating the fluid medium therein, said heat transfer fins projecting from said conduit in a generally radial direction with respect to the flow direction of the fluid medium within said conduit, said heat transfer fins each essentially including a bent fin portion that projects along within the space between said conduit and said insulated backwall toward an adjacent fin.

2. The heat collector according to claim 1 wherein said fins project with an included right angle from the face surface of said conduit toward said backwall and said cover plate.

3. The heat collector according to claim 1 wherein said fins project with an included acute angle from the face surface of said conduit toward said backwall and said cover plate.

4. The heat collector according to claim 1 wherein said conduit passes continuously by spaced-apart parallel runs between first-opposed side walls of said panel along the space between the remaining opposed side walls.

5. The heat collector according to claim 4 wherein said fins extend between said remaining opposed side walls of the collector panel while said fins are spaced to maintain an air gap between the fins.

6. The heat collector according to claim 1 wherein said bent fin portions each projects in the same direction into a closely-spaced relation with the unbent surface of an adjacent fin.

7. The heat collector according to claim 1 wherein said bent fin portions project in a generally coplanar, spaced-apart relation.

8. The heat collector according to claim 1 further comprising a film of heat absorbing material adhered to the face surfaces of said fins to increase absorption of solar radiation.

9. The heat collector according to claim 1 further comprising heating means extending along in a closely-spaced relation from said conduit to supply heat to said fins for maintaining a predetermined minimum temperature within said collector panel.

10. The heat collector according to claim 9 wherein said heating means includes an electrical resistance heating element.

11. The heat collector according to claim 9 further comprising means responsive to the external ambient temperature of the panel for energizing said heating means.

12. The heat collector according to claim 9 wherein said heating means is energized to maintain the temperature of said fins above 0° C.

* * * * *